United States Patent
Todeschini

(10) Patent No.: US 10,747,975 B2
(45) Date of Patent: *Aug. 18, 2020

(54) METHODS FOR CHANGING A CONFIGURATION OF A DEVICE FOR READING MACHINE-READABLE CODE

(71) Applicant: Hand Held Products, Inc., Fort Mill, SC (US)

(72) Inventor: Erik Todeschini, Camillus, NY (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/156,323

(22) Filed: Oct. 10, 2018

(65) Prior Publication Data

US 2019/0042818 A1 Feb. 7, 2019

Related U.S. Application Data

(63) Continuation of application No. 15/642,373, filed on Jul. 6, 2017, now Pat. No. 10,127,423.

(51) Int. Cl.
*G06K 7/14* (2006.01)
*H04N 1/00* (2006.01)

(52) U.S. Cl.
CPC ....... *G06K 7/1413* (2013.01); *H04N 1/00381* (2013.01); *H04N 1/00395* (2013.01)

(58) Field of Classification Search
CPC ............ G06K 7/14; G06T 2207/30108; G06T 2207/30204; G06T 2207/30232; G06T 7/0004; G06T 7/194; G06T 7/70
See application file for complete search history.

(56) References Cited

U.S. PATENT DOCUMENTS

| | | | |
|---|---|---|---|
| 6,832,725 B2 | 12/2004 | Gardiner et al. | |
| 7,128,266 B2 | 10/2006 | Zhu et al. | |

(Continued)

FOREIGN PATENT DOCUMENTS

| | | | |
|---|---|---|---|
| WO | 2013/163789 A1 | 11/2013 | |
| WO | 2013/173985 A1 | 11/2013 | |

(Continued)

OTHER PUBLICATIONS

US. Appl. for Evaluating Image Values filed May 19, 2015 (Ackley); 60 pages., U.S. Appl. No. 14/715,916.

(Continued)

*Primary Examiner* — Seung H Lee
(74) *Attorney, Agent, or Firm* — Alston & Bird LLP

(57) ABSTRACT

A method is provided for controlling a device for reading machine-readable code. A processor, configured by a strike application program monitors for a strike against a surface of the device. The strike is caused by a user either striking the device against a non-device surface or striking the surface of the device without necessarily engaging a button, a capacitive surface, or a resistive surface of the device. The strike comprising a detected strike is detected. An identifying characteristic of the detected strike is determined and it is determined if the detected strike having the identifying characteristic correlates to a particular scan-related operation of the device. The particular scan-related operation correlating to the detected strike having the identifying characteristic is executed in response to determining that the detected strike having the identifying characteristic correlates to a particular scan-related operation.

20 Claims, 2 Drawing Sheets

(56) References Cited

U.S. PATENT DOCUMENTS

| | | | |
|---|---|---|---|
| 7,159,783 | B2 | 1/2007 | Walczyk et al. |
| 7,413,127 | B2 | 8/2008 | Ehrhart et al. |
| 7,726,575 | B2 | 6/2010 | Wang et al. |
| 8,294,969 | B2 | 10/2012 | Plesko |
| 8,317,105 | B2 | 11/2012 | Kotlarsky et al. |
| 8,322,622 | B2 | 12/2012 | Liu |
| 8,366,005 | B2 | 2/2013 | Kotlarsky et al. |
| 8,371,507 | B2 | 2/2013 | Haggerty et al. |
| 8,374,383 | B2 | 2/2013 | Long et al. |
| 8,376,233 | B2 | 2/2013 | Horn et al. |
| 8,381,979 | B2 | 2/2013 | Franz |
| 8,390,909 | B2 | 3/2013 | Plesko |
| 8,408,464 | B2 | 4/2013 | Zhu et al. |
| 8,408,468 | B2 | 4/2013 | Van et al. |
| 8,408,469 | B2 | 4/2013 | Good |
| 8,424,768 | B2 | 4/2013 | Rueblinger et al. |
| 8,448,863 | B2 | 5/2013 | Xian et al. |
| 8,457,013 | B2 | 6/2013 | Essinger et al. |
| 8,459,557 | B2 | 6/2013 | Havens et al. |
| 8,469,272 | B2 | 6/2013 | Kearney |
| 8,474,712 | B2 | 7/2013 | Kearney et al. |
| 8,479,992 | B2 | 7/2013 | Kotlarsky et al. |
| 8,490,877 | B2 | 7/2013 | Kearney |
| 8,517,271 | B2 | 8/2013 | Kotlarsky et al. |
| 8,523,076 | B2 | 9/2013 | Good |
| 8,528,818 | B2 | 9/2013 | Ehrhart et al. |
| 8,542,189 | B2 | 9/2013 | Milne et al. |
| 8,544,737 | B2 | 10/2013 | Gomez et al. |
| 8,548,420 | B2 | 10/2013 | Grunow et al. |
| 8,550,335 | B2 | 10/2013 | Samek et al. |
| 8,550,354 | B2 | 10/2013 | Gannon et al. |
| 8,550,357 | B2 | 10/2013 | Kearney |
| 8,556,174 | B2 | 10/2013 | Kosecki et al. |
| 8,556,176 | B2 | 10/2013 | Van et al. |
| 8,556,177 | B2 | 10/2013 | Hussey et al. |
| 8,559,767 | B2 | 10/2013 | Barber et al. |
| 8,561,895 | B2 | 10/2013 | Gomez et al. |
| 8,561,903 | B2 | 10/2013 | Sauerwein, Jr. |
| 8,561,905 | B2 | 10/2013 | Edmonds et al. |
| 8,565,107 | B2 | 10/2013 | Pease et al. |
| 8,571,307 | B2 | 10/2013 | Li et al. |
| 8,579,200 | B2 | 11/2013 | Samek et al. |
| 8,583,924 | B2 | 11/2013 | Caballero et al. |
| 8,584,945 | B2 | 11/2013 | Wang et al. |
| 8,587,595 | B2 | 11/2013 | Wang |
| 8,587,697 | B2 | 11/2013 | Hussey et al. |
| 8,588,869 | B2 | 11/2013 | Sauerwein et al. |
| 8,590,789 | B2 | 11/2013 | Nahill et al. |
| 8,596,539 | B2 | 12/2013 | Havens et al. |
| 8,596,542 | B2 | 12/2013 | Havens et al. |
| 8,596,543 | B2 | 12/2013 | Havens et al. |
| 8,599,271 | B2 | 12/2013 | Havens et al. |
| 8,599,957 | B2 | 12/2013 | Peake et al. |
| 8,600,158 | B2 | 12/2013 | Li et al. |
| 8,600,167 | B2 | 12/2013 | Showering |
| 8,602,309 | B2 | 12/2013 | Longacre et al. |
| 8,608,053 | B2 | 12/2013 | Meier et al. |
| 8,608,071 | B2 | 12/2013 | Liu et al. |
| 8,611,309 | B2 | 12/2013 | Wang et al. |
| 8,615,487 | B2 | 12/2013 | Gomez et al. |
| 8,621,123 | B2 | 12/2013 | Caballero |
| 8,622,303 | B2 | 1/2014 | Meier et al. |
| 8,628,013 | B2 | 1/2014 | Ding |
| 8,628,015 | B2 | 1/2014 | Wang et al. |
| 8,628,016 | B2 | 1/2014 | Winegar |
| 8,629,926 | B2 | 1/2014 | Wang |
| 8,630,491 | B2 | 1/2014 | Longacre et al. |
| 8,635,309 | B2 | 1/2014 | Berthiaume et al. |
| 8,636,200 | B2 | 1/2014 | Kearney |
| 8,636,212 | B2 | 1/2014 | Nahill et al. |
| 8,636,215 | B2 | 1/2014 | Ding et al. |
| 8,636,224 | B2 | 1/2014 | Wang |
| 8,638,806 | B2 | 1/2014 | Wang et al. |
| 8,640,958 | B2 | 2/2014 | Lu et al. |
| 8,640,960 | B2 | 2/2014 | Wang et al. |
| 8,643,717 | B2 | 2/2014 | Li et al. |
| 8,646,692 | B2 | 2/2014 | Meier et al. |
| 8,646,694 | B2 | 2/2014 | Wang et al. |
| 8,657,200 | B2 | 2/2014 | Ren et al. |
| 8,659,397 | B2 | 2/2014 | Vargo et al. |
| 8,668,149 | B2 | 3/2014 | Good |
| 8,678,285 | B2 | 3/2014 | Kearney |
| 8,678,286 | B2 | 3/2014 | Smith et al. |
| 8,682,077 | B1 | 3/2014 | Longacre, Jr. |
| D702,237 | S | 4/2014 | Oberpriller et al. |
| 8,687,282 | B2 | 4/2014 | Feng et al. |
| 8,692,927 | B2 | 4/2014 | Pease et al. |
| 8,695,880 | B2 | 4/2014 | Bremer et al. |
| 8,698,949 | B2 | 4/2014 | Grunow et al. |
| 8,702,000 | B2 | 4/2014 | Barber et al. |
| 8,717,494 | B2 | 5/2014 | Gannon |
| 8,720,783 | B2 | 5/2014 | Biss et al. |
| 8,723,804 | B2 | 5/2014 | Fletcher et al. |
| 8,723,904 | B2 | 5/2014 | Marty et al. |
| 8,725,842 | B1 | 5/2014 | Al-Nasser |
| 8,727,223 | B2 | 5/2014 | Wang |
| 8,740,082 | B2 | 6/2014 | Wilz, Sr. |
| 8,740,085 | B2 | 6/2014 | Furlong et al. |
| 8,746,563 | B2 | 6/2014 | Hennick et al. |
| 8,750,445 | B2 | 6/2014 | Peake et al. |
| 8,752,766 | B2 | 6/2014 | Xian et al. |
| 8,756,059 | B2 | 6/2014 | Braho et al. |
| 8,757,495 | B2 | 6/2014 | Qu et al. |
| 8,760,563 | B2 | 6/2014 | Koziol et al. |
| 8,763,909 | B2 | 7/2014 | Reed et al. |
| 8,777,108 | B2 | 7/2014 | Coyle |
| 8,777,109 | B2 | 7/2014 | Oberpriller et al. |
| 8,779,898 | B2 | 7/2014 | Havens et al. |
| 8,781,520 | B2 | 7/2014 | Payne et al. |
| 8,783,573 | B2 | 7/2014 | Havens et al. |
| 8,789,757 | B2 | 7/2014 | Barten |
| 8,789,758 | B2 | 7/2014 | Hawley et al. |
| 8,789,759 | B2 | 7/2014 | Xian et al. |
| 8,794,520 | B2 | 8/2014 | Wang et al. |
| 8,794,522 | B2 | 8/2014 | Ehrhart |
| 8,794,525 | B2 | 8/2014 | Amundsen et al. |
| 8,794,526 | B2 | 8/2014 | Wang et al. |
| 8,798,367 | B2 | 8/2014 | Ellis |
| 8,807,431 | B2 | 8/2014 | Wang et al. |
| 8,807,432 | B2 | 8/2014 | Van et al. |
| 8,820,630 | B2 | 9/2014 | Qu et al. |
| 8,822,848 | B2 | 9/2014 | Meagher |
| 8,824,692 | B2 | 9/2014 | Sheerin et al. |
| 8,824,696 | B2 | 9/2014 | Braho |
| 8,842,849 | B2 | 9/2014 | Wahl et al. |
| 8,844,822 | B2 | 9/2014 | Kotlarsky et al. |
| 8,844,823 | B2 | 9/2014 | Fritz et al. |
| 8,849,019 | B2 | 9/2014 | Li et al. |
| D716,285 | S | 10/2014 | Chaney et al. |
| 8,851,383 | B2 | 10/2014 | Yeakley et al. |
| 8,854,633 | B2 | 10/2014 | Laffargue et al. |
| 8,866,963 | B2 | 10/2014 | Grunow et al. |
| 8,868,421 | B2 | 10/2014 | Braho et al. |
| 8,868,519 | B2 | 10/2014 | Maloy et al. |
| 8,868,802 | B2 | 10/2014 | Barten |
| 8,868,803 | B2 | 10/2014 | Caballero |
| 8,870,074 | B1 | 10/2014 | Gannon |
| 8,879,639 | B2 | 11/2014 | Sauerwein, Jr. |
| 8,880,426 | B2 | 11/2014 | Smith |
| 8,881,983 | B2 | 11/2014 | Havens et al. |
| 8,881,987 | B2 | 11/2014 | Wang |
| 8,903,172 | B2 | 12/2014 | Smith |
| 8,908,995 | B2 | 12/2014 | Benos et al. |
| 8,910,870 | B2 | 12/2014 | Li et al. |
| 8,910,875 | B2 | 12/2014 | Ren et al. |
| 8,914,290 | B2 | 12/2014 | Hendrickson et al. |
| 8,914,788 | B2 | 12/2014 | Pettinelli et al. |
| 8,915,439 | B2 | 12/2014 | Feng et al. |
| 8,915,444 | B2 | 12/2014 | Havens et al. |
| 8,916,789 | B2 | 12/2014 | Woodburn |
| 8,918,250 | B2 | 12/2014 | Hollifield |
| 8,918,564 | B2 | 12/2014 | Caballero |
| 8,925,818 | B2 | 1/2015 | Kosecki et al. |
| 8,939,374 | B2 | 1/2015 | Jovanovski et al. |

(56) References Cited

U.S. PATENT DOCUMENTS

| | | |
|---|---|---|
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,007 B2 | 6/2015 | Chau et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,086,796 B2 | 7/2015 | Tsudik |
| 9,224,022 B2 | 12/2015 | Ackley et al. |
| 9,224,027 B2 | 12/2015 | Van et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey et al. |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van et al. |
| D766,244 S | 9/2016 | Zhou et al. |
| 9,443,123 B2 | 9/2016 | Hejl |
| 9,443,222 B2 | 9/2016 | Singel et al. |
| 9,478,113 B2 | 10/2016 | Xie et al. |
| 2007/0063048 A1 | 3/2007 | Havens et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein, Jr. |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein, Jr. |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |

(56) References Cited

U.S. PATENT DOCUMENTS

| | | |
|---|---|---|
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | Digregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0078290 A1 | 3/2016 | Rambler et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Wilz et al. |
| 2016/0314294 A1 | 10/2016 | Kubler et al. |

FOREIGN PATENT DOCUMENTS

| | | |
|---|---|---|
| WO | 2014/019130 A1 | 2/2014 |
| WO | 2014/110495 A1 | 7/2014 |

OTHER PUBLICATIONS

U.S. Appl. No. 29/530,600 for Cyclone filed Jun. 18, 2015 (Vargo et al); 16 pages.

(56) References Cited

OTHER PUBLICATIONS

U.S. Appl. No. 29/528,890 for Mobile Computer Housing filed Jun. 2, 2015 (Fitch et al.); 61 pages.
U.S. Appl. No. 29/526,918 for Charging Base filed May 14, 2015 (Fitch et al.); 10 pages.
U.S. Appl. No. 29/525,068 for Tablet Computer With Removable Scanning Device filed Apr. 27, 2015 (Schulte et al.); 19 pages.
U.S. Appl. No. 29/523,098 for Handle for a Tablet Computer filed Apr. 7, 2015 (Bidwell et al.); 17 pages.
U.S. Appl. No. 29/516,892 for Table Computer filed Feb. 6, 2015 (Bidwell et al.); 13 pages.
U.S. Appl. No. 29/468,118 for an Electronic Device Case, filed Sep. 26, 2013 (Oberpriller et al.); 44 pages.
U.S. Appl. No. 14/446,391 for Multifunction Point of Sale Apparatus With Optical Signature Capture filed Jul. 30, 2014 (Good et al.); 37 pages.
U.S. Appl. No. 14/283,282 for Terminal Having Illumination and Focus Control filed May 21, 2014 (Liu et al.); 31 pages; now abandoned.
U.S. Appl. No. 14/277,337 for Multipurpose Optical Reader, filed May 14, 2014 (Jovanovski et al.); 59 pages; now abandoned.
U.S. Appl. No. 13/367,978, filed Feb. 7, 2012, (Feng et al.); now abandoned.
U.S. Appl. for Tracking Battery Conditions filed May 4, 2015 (Young et al.); 70 pages., U.S. Appl. No. 14/702,979.
U.S. Appl. for Tactile Switch Fora Mobile Electronic Device filed Jun. 16, 2015 (Bamdringa); 38 pages., U.S. Appl. No. 14/740,320.
U.S. Appl. for System and Method for Regulating Barcode Data Injection Into a Running Application on a Smart Device filed May 1, 2015 (Todeschini et al.); 38 pages., U.S. Appl. No. 14/702,110.
U.S. Appl. for Optical Pattern Projector filed Jun. 23, 2015 (Thuries et al.); 33 pages., U.S. Appl. No. 14/747,197.
U.S. Appl. for Method and System to Protect Software-Based Network-Connected Devices From Advanced Persistent Threat filed May 6, 2015 (Hussey et al.); 42 pages., U.S. Appl. No. 14/705,407.
U.S. Appl. for Intermediate Linear Positioning filed May 5, 2015 (Charpentier et al.); 60 pages., U.S. Appl. No. 14/704,050.
U.S. Appl. for Indicia-Reading Systems Having an Interface With a User's Nervous System filed Jun. 10, 2015 (Todeschini); 39 pages., U.S. Appl. No. 14/735,717.
U.S. Appl. for Indicia Reading Device filed Jun. 8, 2015 (Zhou et al.); 14 pages., U.S. Appl. No. 29/529,441.
U.S. Appl. for Hands-Free Human Machine Interface Responsive to a Driver of a Vehicle filed May 6, 2015 (Fitch et al.); 44 pages., U.S. Appl. No. 14/705,012.
U.S. Appl. for Dual-Projector Three-Dimensional Scanner filed Jun. 23, 2015 (Jovanovski et al.); 40 pages., U.S. Appl. No. 14/747,490.
U.S. Appl. for Calibrating a Volume Dimensioner filed Jun. 16, 2015 (Ackley et al.); 63 pages., U.S. Appl. No. 14/740,373.
U.S. Appl. for Augumented Reality Enabled Hazard Display filed May 19, 2015 (Venkatesha et al.); 35 pages., U.S. Appl. No. 14/715,672.
U.S. Appl. for Application Independent DEX/UCS Interface filed May 8, 2015 (Pape); 47 pages., U.S. Appl. No. 14/707,123.
Applicant Initiated Interview Summary (PTOL-413) dated Mar 28, 2018 for U.S. Appl. No. 15/642,373.
European search opinion dated Nov. 20, 2018 for EP Application No. 18181267.8.
European search report dated Nov. 20, 2018 for EP Application No. 18181267.8.
Humayoun et al., 3D Accelerometer-based Gestures for Interacting with Mobile Devices, 2016, [online] [retrieved on Mar. 23, 2020] retrieved from the Internet URL: https://dl.acm.org/doi/10.1145/2971485_2996736, 6 pages.
Lu et al., Gesture Avatar: A Technique for Operating Mobile User Interfaces Using Gestures, 2011, [online] [retrieved Mar. 23, 2020] retrieved from the Internet https://research.google/pubs/pub37154/, 10 pages.
Non-Final Rejection dated Feb. 1, 2018 for U.S. Appl. No. 15/642,373.
Notice of Allowance and Fees Due (PTOL-85) dated Jul. 6, 2018 for U.S. Appl. No. 15/642,373.
Ruiz et al., User-Defined Motion Gestures for Mobile Interaction, 2011, [online] [retrieved on Mar. 10, 2020] retrieved from the Internet URL: https://www.google.com/search?q=user-defined+motion+gestures+for-30 mobile+interaction&rlz=1C1GCEB_enUS853US853&oq, 8 pages.

METHODS FOR CHANGING A CONFIGURATION OF A DEVICE FOR READING MACHINE-READABLE CODE

CROSS-REFERENCE TO RELATED APPLICATIONS

This application is a continuation of U.S. patent application Ser. No. 15/642,373, filed Jul. 6, 2017, the contents of which is hereby incorporated by reference in its entirety.

FIELD OF THE INVENTION

The present invention relates to devices and methods for reading machine-readable code and, more particularly, relates to methods for changing a configuration of a device for reading machine-readable code.

BACKGROUND

Reading (i.e., scanning) machine-readable code with devices such as Smartphones has become very common. During use of the device, a user may want to execute a particular scan-related operation such as initiating scanning, terminating scanning, performing a particular scan-related function (e.g., focusing, zooming in or out, etc.), or changing or configuring a scan setting. However, execution of a scan-related function may require the user of the device to navigate to and press or touch buttons, capacitive surfaces, or resistive surfaces. Therefore, executing a scan-related operation can be a difficult and/or slow process. The buttons may be overlaid upon a video feed of the machine-readable code, but this is also not ideal as it detracts from the aesthetics of the video feed. Navigation to and/or engagement with the buttons and other surfaces may also be difficult to do with the same hand that is holding the device while the other hand holds the item on which the machine-readable code to be read (scanned) appears.

Therefore, a need exists for methods for changing a configuration of a device for reading machine reading code. There is also a need for methods for changing a configuration of the device for reading machine-readable code that can be easily and quickly performed with one hand, without engaging a button, a capacitive surface, or a resistive surface of the device.

SUMMARY

Accordingly, in one aspect, the present invention embraces a method for changing a configuration of a device for reading machine-readable code. In various embodiments, the method comprises monitoring for a strike against a surface of the device. The strike is caused by a user either striking the device against a non-device surface or striking the surface of the device without engaging a button, a capacitive surface, or a resistive surface of the device. The strike is detected. An identifying characteristic of the detected strike is determined. It is determined if the detected strike having the identifying characteristic correlates to a particular scan-related operation of the device. In response to determining that the detected strike having the identifying characteristic correlates to a particular scan-related operation, the particular scan-related operation correlating to the detected strike having the identifying characteristic is executed.

A method for changing a configuration of a device for reading machine-readable code is provided according to various embodiments of the present invention. The method comprises detecting a strike on a surface of the device after scanning has been initiated. An identifying characteristic of the detected strike is determined. The detected strike having the identifying characteristic is correlated to a particular scan-related operation. The particular scan-related operation correlating to the detected strike having the identifying characteristic is executed.

A method for changing a configuration of a device for reading machine-readable code is provided according to various embodiments of the present invention. The method comprises monitoring for a strike on a surface of the device. The strike is detected. An identifying characteristic of detected strike is determined. It is determined if the detected strike having the identifying characteristic correlates to a particular scan-related operation. The particular scan-related operation is executed in response to determining that the detected strike has the identifying characteristic correlating to a particular scan-related operation. Monitoring for strike comprises monitoring a plurality of signals from an inertia-based sensor of the device for an increase in linear acceleration of a signal on an X-axis, a Y-axis, and a Z-axis. Detecting the strike comprises detecting the increase in linear acceleration above a predetermined threshold level on at least one of the X, Y, and Z-axes.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces methods for changing a configuration of a device for reading (i.e., scanning) machine-readable code. As hereinafter described, a strike against a surface of the device controls the device by causing a processor of the device to execute a particular scan-related operation that correlates to an identifying characteristic of the strike. As used herein the term "strike" refers to a quick light blow or blows against a surface of the device, by either striking the device itself against a surface or striking the surface of the device without engaging a button, a capacitive surface, or a resistive surface (such as a touch screen) of the device. A strike against the device may, according to various embodiments, cause the processor (that is configured by a strike application program (i.e., a software program of the device) to execute the scan-related operation such as initiating a scan operation, terminating a scan operation, changing or configuring a scan setting of the device, performing a particular scan-related function, or combinations thereof, as hereinafter described. Execution of any of these scan-related operations changes a configuration of the device for reading machine-readable code according to various embodiments. Such methods permit easy and quick device configuration changes that can be easily and quickly performed with one hand, without navigating to and/or engaging a button, a capacitive surface, or a resistive surface of the device.

As known in the art, devices that read machine-readable code include indicia-reading devices such as hand-held indicia readers such as trigger-type readers and mobile computing devices such as Smartphones, a tablet, portable computer, a stationary terminal being fixed to a single position, such as along an assembly line, etc. The machine-readable code comprises an indicium into which data has been encoded. The indicia are optical representations of the data. Data encoded into an indicium may be read (i.e., scanned) by the device. The device reads the machine-readable code (indicia) to obtain a scanned signal. The scanned signal is converted into decoded data. The decoded data may be transmitted to a host device communicatively coupled to the device.

Figure 1:
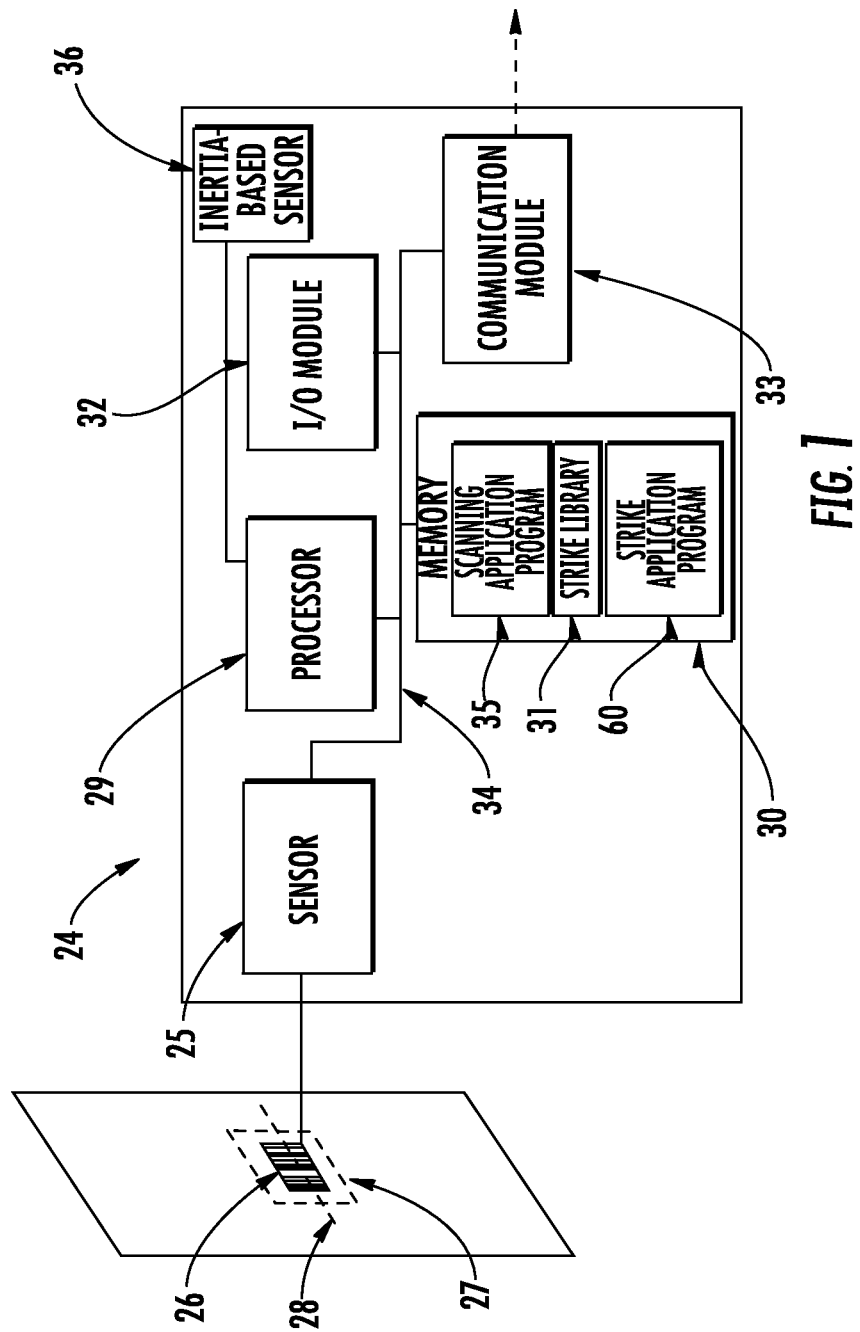
FIG. 1 schematically depicts an exemplary device for reading machine-readable code including a strike application program (a "software program") for changing a configuration of the device and an exemplary machine-readable code, according to various embodiments of the present invention.

There are many types of machine-readable code (i.e., indicia) for many applications. Indicia may be one-dimensional barcodes (e.g., Universal Product Code, UPC) (see, e.g., barcode 26 in FIG. 1) having dark lines (i.e., bars) and light lines (i.e., spaces) of various widths arranged along a scan axis. Indicia may be two-dimensional matrix symbols (e.g., Aztec Code, Data Matrix, QR code, etc.) having a two-dimensional array of light features, dark features, and (in some cases) alignment features. Some indicia may use color (e.g., HCCB) to encode data. Indicia are typically printed and affixed to an item (a portion of an item is shown in FIG. 1). Often, the encoded information relates to the item on which the indicia is affixed. Electronically displayed indicia may replace printed indicia in some applications, especially in applications run on a smartphone with a display.

Generally speaking, there are many smartphone applications that require the ability to scan a barcode. In order to add this functionality to their application (app), developers quite frequently rely on third party software development kits to add this functionality directly within their application. The functionality gives the smartphone user access to barcode scanning only from within that particular application. A user may alternatively be able to use a universal method of scanning barcodes across all their applications. A suitable exemplary software program for executing the steps of the methods according to various embodiments includes the SwiftDecoder Mobile Barcode Decoding Software by Honeywell International, Inc. According to various embodiments, the methods described herein may be used from within a particular application and/or when using the universal method.

Referring now to FIG. 1, according to various embodiments, a device 24 for reading machine-readable code (e.g., barcode 26 of FIG. 1) generally comprises a sensor 25 for capturing the machine-readable code, a memory 30 for storing one or more software programs, and a processor 29. The device 24 may further comprise an input/output (IO) module 32 (e.g., a user interface) for transmitting/receiving information to/from a user. The input/output module may include a visual display such as a touchscreen display. The touchscreen display may comprise a capacitive touchscreen display or a resistive touchscreen display. The input/output module may include one or more buttons permitting the user to interface with the device by touch or press. In accordance with various embodiments of the present invention, as previously noted, the device 24 for reading machine-readable code may be configured without the user engaging the button(s), the capacitive surface(s), or the resistive surface(s). However, the input/output module 32 may additionally be available to control the device for reading machine-readable code. The subsystems in the device 24 are electrically coupled via couplers (e.g., wires or fibers) to form an interconnection subsystem 34. The interconnection subsystem may include power buses or lines, data bases, instruction buses, address buses, etc. that allow operation of the various modules/subsystems and the interaction therebetween.

In accordance with various embodiments as hereinafter described, the device 24 further comprises an inertia-based sensor (such as a 3-axis accelerometer). The processor 29 is communicatively coupled to the sensor 25, the inertia-based sensor, and the memory 30. As is known in the art, the processor 29 is configured by a scanning software program to receive information from the machine-readable code (e.g., barcode 26 of FIG. 1) and convert the information into decoded data. The sensor 25 reads (i.e., scans) the machine-readable code. The device 24 may use a variety of techniques to read the code.

In various embodiments, the sensor 25 may include a laser scanner for scanning a laser across a field of view. A collimated beam of laser light is swept back and forth along a scan-line 28 aligned with the machine-readable code (e.g., barcode 26 of FIG. 1). As the light beam encounters the light and dark areas of the barcode 26, it is reflected back toward the sensor 25 differently. The light areas of the barcode reflect more than the dark areas of the barcode. The reflected light is captured and detected by a light detector (e.g., photodiode) in the sensor 25. The light detector converts the reflected light into a scanned signal. The scanned signal may be an electronic signal with a modulated amplitude corresponding to the barcode pattern. This modulated signal may be converted into decoded data by the processor (e.g., one or more controller, digital signal processor (DSP), application specific integrated circuit (ASIC), programmable gate array (PGA), and/or programmable logic controller (PLC)) communicatively coupled to the sensor.

In various embodiments, the sensor 25 includes an image sensor (e.g., a CCD, CMOS sensor, etc. (collectively "a camera") for capturing images of a field of view 27. To scan a barcode 26, the field of view 27 of the camera is positioned to contain the machine-readable code (e.g., barcode 26) and an image is captured with the image sensor. The processor 29 communicatively coupled to the sensor 25 converts the image of the machine-readable code into the decoded data. When reading the machine-readable code, there may be a full screen camera video feed on a display (depicted as I/O module of FIG. 1) of the device, helping the user aim the camera of the device toward the machine-readable code. The larger the camera preview viewfinder, the better the scanning operation.

The memory 30 of device 24 can store executable instructions, such as, for example, computer readable instructions (e.g., software), that can be executed by the processor 29. The memory 30 can be volatile or nonvolatile memory. The memory 30 can also be removable (e.g., portable) memory, or non-removable (e.g., internal) memory. For example, the memory 30 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (MD) or other optical disk storage, and/or a magnetic medium such as magnetic cassettes, tapes, or disks, hard drive, etc. among other types of memory commonly known to those of ordinary skill in the art.

The memory 30 stores information including a processor-executable software program (i.e., application) for scanning and decoding the machine-readable code (hereinafter "scanning application program 35"). The scanning application program configures the processor 29 to receive the information from the sensor 25 as a scanned signal (e.g., modulated analog signal or image). It then converts this scanned signal into decoded data (e.g., digital data representing the information stored in the machine-readable code). In a system for reading machine-readable code, the decoded data may be transmitted to a host device as previously noted. The system includes the device 24 for reading the machine-readable code. The system may also include the host device (not shown) communicatively coupled to the device 24 via a wired or wireless data link. The interface between the device 24 and the host device (not shown) may be accessed by a communication module 33 integrated with the device 24. In a wireless configuration, the communication module 33 may communicate with the host device via a variety of communication protocols (e.g., IEEE 802.11, including WI-FI®, BLUETOOTH®, CDMA, TDMA, or GSM).

In accordance with various embodiments of the present invention, the memory 30 may further include a processor-executable software program 60 (i.e., application program) for detecting a strike against a surface of the device 24 (a "strike application program" 60 or "strike software program"). The memory 30 may also include a strike library 31 that correlates a strike having an identifying characteristic to a particular scan-related operation. While the strike library 31 and the strike application program 60 are depicted separately in FIG. 1, the strike library 31 may be included in the strike application program 60. The processor 29 may access the memory 30 to execute the steps of the one or more application programs. The strike application program 60 may be integrated into the scanning application program 35 (such as the SwiftDecoder Mobile Barcode Decoding Software by Honeywell International, Inc.) or the strike application program 60 may be a separate application program stored in memory 30 of device 24.

While the memory 30 is depicted as positioned in the device, it is to be understood the memory 30 can be positioned internal to another computing resource, thereby enabling computer readable instructions to be downloaded over the internet or another wired or wireless connection. While the application programs are depicted as included in memory 30, it is also to be understood that one or more application programs (including all or part of the strike application program) may be additionally or alternatively included in a mass storage device (not shown) of the device 24. The operating system of the device 24 may also be included in the mass storage device.

The processor 29 is configured by the strike software program 60 to monitor for a strike on an (exterior) surface of the device 24, detect the strike comprising a detected strike, determine an identifying characteristic of the strike, determine if the detected strike has the identifying characteristic correlating to a particular scan-related operation, and execute the particular scan-related operation in response to determining that the detected strike has the identifying characteristic correlating to the particular scan-related operation. The processor 29 examines the identifying characteristic(s) of the strike and compares it with strike characteristics in the strike library 31. If the identifying characteristic of the strike matches (at least part of) (i.e., correlates) to a particular scan-related operation in the strike library 31 (or meets some other criteria based on stored data in the library), then the particular scan-related operation is executed by the processor (configured by the strike application program). The particular scan-related operation that is executed depends on the identifying characteristic of the detected strike.

As noted previously, in accordance with various embodiments, the device 24 further comprises the inertia-based sensor 36 (such as a 3-axis accelerometer) for detecting and outputting a signal showing an increase in linear acceleration on an X-axis, a Y-axis, and a Z-axis. The signal showing the increase in linear acceleration reflects the strike against the surface of the device 24.

Figure 2:
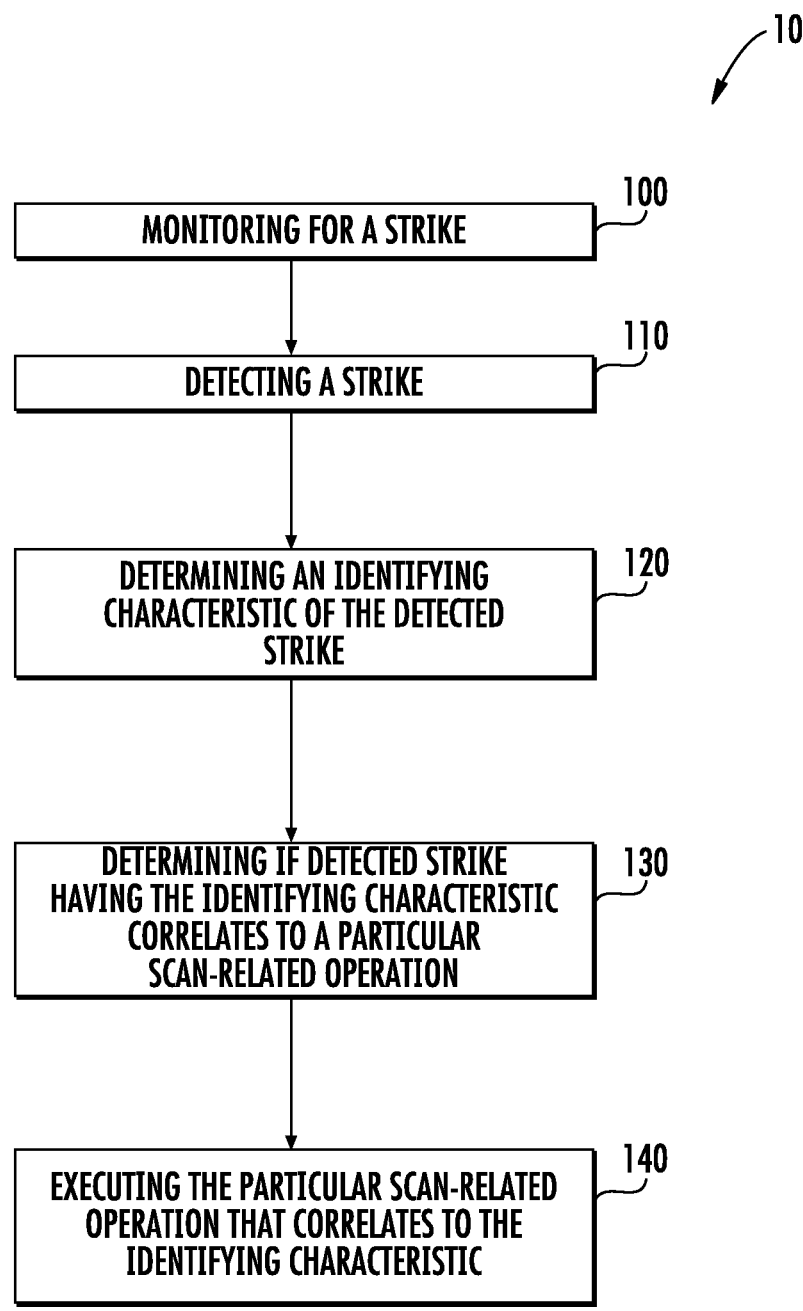
FIG. 2 depicts a flow chart of a method for changing a configuration of a device for reading machine-readable code according to various embodiments of the present invention.

Referring now to FIG. 2, according to various embodiments of the present invention, a method 10 for changing a configuration of the device for reading machine-readable code (such as the barcode scanner exemplified in FIG. 1) comprises monitoring for a strike against a surface of the device (step 100). As noted previously, the strike against the surface of the device is by a user either striking the device against a non-device surface or striking the surface of the device without necessarily engaging a button, toggle or switch (collectively "button") a capacitive surface, or a resistive surface of the device. The term "engaging" or the like is used herein to distinguish the strike from a touch or tap input on a button, capacitive surface, or resistive surface of the device. The strike is known by the user as having an identifying characteristic that correlates to a particular scan-related operation, i.e., the user is provided with instructions as to how to control the device for reading machine-readable code. The instructions to the user may be provided in any number of ways. As examples only, the user may be instructed that, to initiate scanning, a single blow (strike) to the surface of the device is required. The user may be instructed that, to zoom in, a strike having a particular strike pattern needs to be used, etc. The user may be instructed that a particular strike intensity can control the device. For example, a soft tap or strike may result in a smaller zoom whereas a hard tap or strike may result in a relatively larger zoom. The identifying characteristic may be dependent on workflow (e.g., to initiate a certain type of scan operation versus once the scan is in progress) and/or device orientation. For example, the user may be instructed that a single strike initiates a single scan or that multiple strikes initiates multiple scans, etc.). Once the scan is in progress, the user may be instructed that the same or a different strike may be used, for example, to enable flash, zoom, terminate the scan, etc. As for device orientation, a different set of strike commands may be enabled in portrait mode versus landscape mode.

As the instructions are for the device, the user need not be provided instructions each time the device is used. However, the user of the device for reading machine-readable code needs to know in advance of the strike how to strike the surface of the device in order to intentionally execute the intended scan-related operation. Monitoring for the strike comprises monitoring a plurality of signals from the inertia-based sensor 36 of the device for a signal showing an increase in linear acceleration on an X-axis, a Y-axis, and a Z-axis. The processor 29, configured by the strike application program 60, may monitor the signals from the inertia-based sensor 36 continuously, or before, during, and after scanning is initiated.

Still referring to FIG. 2, according to various embodiments of the present invention, the method 10 for changing a configuration of a device for reading machine-readable code continues by detecting the strike comprising a detected strike (step 110). Detecting the strike comprises detecting the increase in linear acceleration above a predetermined threshold level on at least one of the X, Y, and Z-axes. The inertia-based sensor detects the increase in linear acceleration as vibration. When the linear acceleration on at least one axis increases above the predetermined threshold level, the processor 29 detects the strike as a detected strike. If the increase in linear acceleration is not above the predetermined threshold level, the strike is not "detected" and the method stops.

Still referring to FIG. 2, according to various embodiments of the present invention, the method 10 for controlling a device for reading machine-readable code continues by determining an identifying characteristic of the detected strike (step 120). Determining the identifying characteristic of the detected strike comprises determining that the detected strike comprises a particular number of blows, a strike pattern, a strike intensity, a particular strike location on the device, or combinations thereof. While exemplary identifying characteristics of the detected strike are described, it is to be understood that the detected strike may have alternative or additional characteristics that may be determined for purposes as hereinafter described. As noted previously, the identifying characteristic may be dependent on workflow and/or device orientation.

Still referring to FIG. 2, according to various embodiments of the present invention, the method 10 for changing a configuration of a device for reading machine-readable code continues by determining if the detected strike having the identifying characteristic correlates to a particular scan-related operation of the device 24 (step 130). Determining if the detected strike having the identifying characteristic is correlated with a particular scan-related operation comprises receiving stored information that the detected strike having the identifying characteristic correlates to the particular scan-related operation. Receiving stored information that the detected strike having the identifying characteristic correlates to the particular scan-related operation comprises receiving the stored information from the strike library 31 in the memory 30 of the device 24 for reading machine-readable code that stores information correlating a plurality of detected strikes each having a different identifying characteristic to a different particular scan-related operation.

If the strike does not have an identifying characteristic that correlates to a particular scan-related operation, the detected strike is disregarded by the processor 29 (shown as "stop") in FIG. 2. In response to determining that the detected strike does not have an identifying characteristic that correlates to a particular scan-related operation, device operation prior to the detected strike may continue or resume without the change in the configuration of the device for reading machine-readable code, i.e., the detected strike is disregarded.

Still referring to FIG. 2, according to various embodiments of the present invention, the method 10 for changing a configuration of a device for reading machine-readable code continues by executing the particular scan-related operation that correlates to the detected strike having the identifying characteristic (in response to determining that the detected strike having the identifying characteristic correlates to a particular scan-related operation) (step 140). As noted previously, executing the particular scan-related operation may comprise initiating scanning, terminating scanning, performing a particular scan-related function, changing a scan setting, or configuring a scan setting of the device. This may include toggling an existing scan setting between two states (e.g., an on and off state), adjusting flash intensity, configuring for a continuous scan mode or other scan mode, zooming in or out, focusing, changing an illuminating setting, etc. Therefore, the detected strike results in causing the processor configured by the strike application program to execute the particular scan-related operation correlated to the strike having the identifying characteristic. Executing the particular scan-related operation results in the change to the configuration of the device for reading machine-readable code, i.e., the processor configured by the strike application program executes the particular scan-related operation that correlates to the detected strike having the identifying characteristic.

For example, to initiate scanning, a user may strike the surface of the device. The surface comprises any exterior surface of the device. The stricken exterior surface may unintentionally include a button or touch screen display of the device 24. The strike library 31 may include information that a strike comprising a single blow (an exemplary identifying characteristic comprising the number of strikes) correlates to the particular scan-related operation of initiating scanning. When scanning is initiated by the application (by detecting, for example, a strike having the identifying characteristic correlated to the particular scan-related operation of initiating scanning), a real-time camera preview user interface may be displayed which is used as a viewfinder by the user.

As the device 24 may be unintentionally dropped (likely to be detected as a detected strike having a single blow as the identifying characteristic), it may be necessary to assign additional identifying characteristics to a single blow strike to substantially safeguard against an unintended change in the configuration of the device by dropping of the device.

When a user would like to toggle to a certain setting after initiating scanning (e.g., turning on/off the flash), the user simply strikes a surface of the device with the identifying characteristic known to be correlated in the strike library 31 with the particular scan-related operation of performing the scan-related function of turning on/off the flash. The inertia-based sensor detects the strike (the linear acceleration) as vibration) and determines if the detected strike has the identifying characteristic. The processor 29, configured by the strike application program 60 correlates the detected strike having the identifying characteristic to a particular scan-related operation of the device. For example, a single strike may correlate to the flash being toggled between an on and off state. A double strike may cause the camera to zoom out whereas a triple strike may cause the camera to zoom in. It is to be understood that these are examples only. A strike comprising a single blow to a surface of the device (i.e., a "single strike") or a double blow ("a double strike) may be correlated to other than flash toggling and other than zoom in/zoom out operations and/or other characteristics of the strike may correlate to these and other scan-related operations or functions.

From the foregoing, it is to be understood that the methods according to various embodiments of the present invention changes a configuration of devices for reading machine-readable code, without necessarily engaging a button, a capacitive surface, or a resistive surface (such as a touch screen) of the device. Such methods enable one-handed control of the devices for reading machine-readable code. Interacting with the device scanning system in this way can easily be done with the same hand that is holding the device, is much quicker than navigating to and engaging with buttons, and other surfaces, and does not detract from aesthetics that may otherwise be caused by having to press or touch a button.

To supplement the present disclosure, this application incorporates entirely by reference the following commonly assigned patents, patent application publications, and patent applications:
U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. No. 8,727,223; U.S. Pat. No. D702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;
U.S. Pat. Nos. 8,794,522; 8,794,525;
U.S. Pat. Nos. 8,794,526; 8,798,367;
U.S. Pat. Nos. 8,807,431; 8,807,432;
U.S. Pat. Nos. 8,820,630; 8,822,848;
U.S. Pat. Nos. 8,824,692; 8,824,696;
U.S. Pat. Nos. 8,842,849; 8,844,822;
U.S. Pat. Nos. 8,844,823; 8,849,019;
U.S. Pat. Nos. 8,851,383; 8,854,633;
U.S. Pat. Nos. 8,866,963; 8,868,421;
U.S. Pat. Nos. 8,868,519; 8,868,802;
U.S. Pat. Nos. 8,868,803; 8,870,074;
U.S. Pat. Nos. 8,879,639; 8,880,426;
U.S. Pat. Nos. 8,881,983; 8,881,987;
U.S. Pat. Nos. 8,903,172; 8,908,995;
U.S. Pat. Nos. 8,910,870; 8,910,875;
U.S. Pat. Nos. 8,914,290; 8,914,788;
U.S. Pat. Nos. 8,915,439; 8,915,444;
U.S. Pat. Nos. 8,916,789; 8,918,250;
U.S. Pat. Nos. 8,918,564; 8,925,818;
U.S. Pat. Nos. 8,939,374; 8,942,480;
U.S. Pat. Nos. 8,944,313; 8,944,327;
U.S. Pat. Nos. 8,944,332; 8,950,678;
U.S. Pat. Nos. 8,967,468; 8,971,346;
U.S. Pat. Nos. 8,976,030; 8,976,368;
U.S. Pat. Nos. 8,978,981; 8,978,983;
U.S. Pat. Nos. 8,978,984; 8,985,456;
U.S. Pat. Nos. 8,985,457; 8,985,459;
U.S. Pat. Nos. 8,985,461; 8,988,578;
U.S. Pat. Nos. 8,988,590; 8,991,704;
U.S. Pat. Nos. 8,996,194; 8,996,384;
U.S. Pat. Nos. 9,002,641; 9,007,368;
U.S. Pat. Nos. 9,010,641; 9,015,513;
U.S. Pat. Nos. 9,016,576; 9,022,288;
U.S. Pat. Nos. 9,030,964; 9,033,240;
U.S. Pat. Nos. 9,033,242; 9,036,054;
U.S. Pat. Nos. 9,037,344; 9,038,911;
U.S. Pat. Nos. 9,038,915; 9,047,098;
U.S. Pat. Nos. 9,047,359; 9,047,420;
U.S. Pat. Nos. 9,047,525; 9,047,531;
U.S. Pat. Nos. 9,053,055; 9,053,378;
U.S. Pat. Nos. 9,053,380; 9,058,526;
U.S. Pat. Nos. 9,064,165; 9,064,167;
U.S. Pat. Nos. 9,064,168; 9,064,254;
U.S. Pat. Nos. 9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;

U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;

U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTI-PURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HANDHELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HANDHELD DIMENSIONER WITH DATA-QUALITY INDICATION filed Oct. 21, 2014 (Laffargue et al.);
U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);
U.S. patent application Ser. No. 14/705,012 for HANDS-FREE HUMAN MACHINE INTERFACE RESPONSIVE TO A DRIVER OF A VEHICLE filed May 6, 2015 (Fitch et al.);
U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);
U.S. patent application Ser. No. 14/707,037 for SYSTEM AND METHOD FOR DISPLAY OF INFORMATION USING A VEHICLE-MOUNT COMPUTER filed May 8, 2015 (Chamberlin);
U.S. patent application Ser. No. 14/707,123 for APPLICATION INDEPENDENT DEX/UCS INTERFACE filed May 8, 2015 (Pape);
U.S. patent application Ser. No. 14/707,492 for METHOD AND APPARATUS FOR READING OPTICAL INDICIA USING A PLURALITY OF DATA SOURCES filed May 8, 2015 (Smith et al.);
U.S. patent application Ser. No. 14/710,666 for PRE-PAID USAGE SYSTEM FOR ENCODED INFORMATION READING TERMINALS filed May 13, 2015 (Smith);
U.S. patent application Ser. No. 29/526,918 for CHARGING BASE filed May 14, 2015 (Fitch et al.);
U.S. patent application Ser. No. 14/715,672 for AUGMENTED REALITY ENABLED HAZARD DISPLAY filed May 19, 2015 (Venkatesha et al.);
U.S. patent application Ser. No. 14/715,916 for EVALUATING IMAGE VALUES filed May 19, 2015 (Ackley);
U.S. patent application Ser. No. 14/722,608 for INTERACTIVE USER INTERFACE FOR CAPTURING A DOCUMENT IN AN IMAGE SIGNAL filed May 27, 2015 (Showering et al.);
U.S. patent application Ser. No. 29/528,165 for IN-COUNTER BARCODE SCANNER filed May 27, 2015 (Oberpriller et al.);
U.S. patent application Ser. No. 14/724,134 for ELECTRONIC DEVICE WITH WIRELESS PATH SELECTION CAPABILITY filed May 28, 2015 (Wang et al.);
U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);
U.S. patent application Ser. No. 14/724,908 for IMAGING APPARATUS HAVING IMAGING ASSEMBLY filed May 29, 2015 (Barber et al.);
U.S. patent application Ser. No. 14/725,352 for APPARATUS AND METHODS FOR MONITORING ONE OR MORE PORTABLE DATA TERMINALS (Caballero et al.);
U.S. patent application Ser. No. 29/528,590 for ELECTRONIC DEVICE filed May 29, 2015 (Fitch et al.);
U.S. patent application Ser. No. 29/528,890 for MOBILE COMPUTER HOUSING filed Jun. 2, 2015 (Fitch et al.);
U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);
U.S. patent application Ser. No. 14/732,870 for DATA COLLECTION MODULE AND SYSTEM filed Jun. 8, 2015 (Powilleit);
U.S. patent application Ser. No. 29/529,441 for INDICIA READING DEVICE filed Jun. 8, 2015 (Zhou et al.);
U.S. patent application Ser. No. 14/735,717 for INDICIA READING SYSTEMS HAVING AN INTERFACE WITH A USER'S NERVOUS SYSTEM filed Jun. 10, 2015 (Todeschini);
U.S. patent application Ser. No. 14/738,038 for METHOD OF AND SYSTEM FOR DETECTING OBJECT WEIGHING INTERFERENCES filed Jun. 12, 2015 (Amundsen et al.);
U.S. patent application Ser. No. 14/740,320 for TACTILE SWITCH FOR A MOBILE ELECTRONIC DEVICE filed Jun. 16, 2015 (Bandringa);
U.S. patent application Ser. No. 14/740,373 for CALIBRATING A VOLUME DIMENSIONER filed Jun. 16, 2015 (Ackley et al.);
U.S. patent application Ser. No. 14/742,818 for INDICIA READING SYSTEM EMPLOYING DIGITAL GAIN CONTROL filed Jun. 18, 2015 (Xian et al.);
U.S. patent application Ser. No. 14/743,257 for WIRELESS MESH POINT PORTABLE DATA TERMINAL filed Jun. 18, 2015 (Wang et al.);
U.S. patent application Ser. No. 29/530,600 for CYCLONE filed Jun. 18, 2015 (Vargo et al);
U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);
U.S. patent application Ser. No. 14/744,836 for CLOUD-BASED SYSTEM FOR READING OF DECODABLE INDICIA filed Jun. 19, 2015 (Todeschini et al.);
U.S. patent application Ser. No. 14/745,006 for SELECTIVE OUTPUT OF DECODED MESSAGE DATA filed Jun. 19, 2015 (Todeschini et al.);
U.S. patent application Ser. No. 14/747,197 for OPTICAL PATTERN PROJECTOR filed Jun. 23, 2015 (Thuries et al.);
U.S. patent application Ser. No. 14/747,490 for DUAL-PROJECTOR THREE-DIMENSIONAL SCANNER filed Jun. 23, 2015 (Jovanovski et al.); and
U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the present invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:
1. A method for controlling a device, the method comprising:
   detecting a strike against an external surface of the device, the strike caused by an intentional strike by a user with a touch input on the external surface of the device;
   determining an identifying characteristic of the detected strike;
   determining if the identifying characteristic of the detected strike correlates to a pre-defined operation of the device; and
   executing the pre-defined operation of the device in response to determining that the identifying characteristic of the detected strike correlates to the pre-defined operation.

2. The method according to claim 1, further comprising: monitoring a plurality of signals output from an inertia-based sensor of the device for a signal showing an increase in linear acceleration on at least one of an X-axis, a Y-axis, or a Z-axis that exceeds a threshold.

3. The method according to claim 1, further comprising: identifying at least one additional identifying characteristic of the detected strike in an instance in which the detected strike represents an unintended drop of the device so as to differentiate the intentional strike on the device from the unintended drop.

4. The method according to claim 1, further comprising: determining if the identifying characteristic of the detected strike comprises at least one of a pre-defined number of strikes, a strike pattern, a strike intensity, or a particular strike location on the device.

5. The method according to claim 1, wherein the device comprises a memory, wherein the memory comprises information that correlates each different identifying characteristic to a different pre-defined operation.

6. The method according to claim 1, wherein determining if the identifying characteristic of the detected strike correlates to the pre-defined operation of the device is determined based on at least one of a workflow or an orientation of the device.

7. The method according to claim 1, wherein the pre-defined operation comprises one of:
initiating or terminating a scan operation;
performing a pre-specified function; or
changing or configuring a scan setting of the device.

8. A device comprising:
an inertia-based sensor;
an input-output subsystem;
a processor, communicatively coupled to the inertia-based sensor and the input-output subsystem, wherein the processor is configured to:
detect a strike against an external surface of the device, the strike caused by an intentional strike by a user with a touch input on the external surface of the device;
determine an identifying characteristic of the detected strike;
determine a correlation between the identifying characteristic of the detected strike and a pre-defined operation of the device; and
execute the pre-defined operation in response to the determined correlation.

9. The device according to claim 8, wherein the processor is further configured to identify at least one additional identifying characteristic of the detected strike in an instance in which the detected strike represents an unintended drop of the device so as to differentiate the intentional strike on the device from the unintended drop.

10. The device according to claim 8, wherein the processor is further configured to monitor a plurality of signals output from the inertia-based sensor of the device for a signal showing an increase in linear acceleration on at least one of an X-axis, a Y-axis, or a Z-axis that exceeds a threshold.

11. The device according to claim 8, wherein the processor is further configured to determine the identifying characteristic based on at least one of a workflow or an orientation of the device.

12. The device according to claim 8, wherein, prior to detection of the strike, the processor is configured to:
monitor a plurality of signals output from the inertia-based sensor of the device for a signal showing an increase in linear acceleration on at least one of an X-axis, a Y-axis, or a Z-axis that exceeds a threshold.

13. The device according to claim 8, wherein the identifying characteristic of the detected strike comprises at least one of a pre-defined number of strikes, a strike pattern, a strike intensity, or a particular strike location on the device.

14. The device according to claim 8, further comprises a memory, wherein the memory is configured to store information that correlates each different identifying characteristic to a different pre-defined operation.

15. The device according to claim 8, wherein the pre-defined operation comprises one of:
terminate scanning;
perform a scan-related function; or
change or configure a scan setting.

16. A method for controlling a device, the method comprising:
monitoring for a strike on a surface of the device by monitoring a plurality of signals output from an inertia-based sensor of the device for a signal representing an increase in linear acceleration on at least one of an X-axis, a Y-axis, or a Z-axis;
determining if the increase in linear acceleration is above a predetermined threshold on at least one of the X-axis, the Y-axis, or the Z-axis;
determining an identifying characteristic of the detected strike;
determining if the identifying characteristic of the detected strike correlates to a pre-defined operation of the device; and
in response to determining that the identifying characteristic of the detected strike correlates to the pre-defined operation, executing the pre-defined operation.

17. The method according to claim 16, wherein determining the identifying characteristic of the detected strike further comprises determining that the detected strike comprises at least one of a pre-defined number of strikes, a strike pattern, a strike intensity, or a particular strike location on the device.

18. The method according to claim 16, wherein executing the pre-defined operation further comprises one of initiating scanning, terminating scanning, performing a particular scan-related function, changing a first scan setting, or configuring a second scan setting.

19. The method according to claim 18, wherein the particular scan-related function comprises focusing, zooming in, zooming out, or combinations thereof.

20. The method according to claim 18, wherein changing the first scan setting or configuring the second scan setting comprises at least one of toggling an existing scan setting between two states, changing or configuring a flash setting, changing or configuring a scan mode, changing or configuring a zoom setting, changing or configuring a focus setting, and changing or configuring an illumination setting.

* * * * *